United States Patent [19]

Chung et al.

[11] 4,222,955

[45] Sep. 16, 1980

[54] 3,5-DIAMINO-4-TERT.-ALKYLBENZONITRILES

[75] Inventors: Daniel A. Chung, North Canton; John P. Lawrence, Stow, both of Ohio

[73] Assignee: The Goodyear Tire & Rubber Company, Akron, Ohio

[21] Appl. No.: 71,529

[22] Filed: Aug. 31, 1979

Related U.S. Application Data

[62] Division of Ser. No. 13,697, Feb. 21, 1979.

[51] Int. Cl.$^2$ ............................................. C07C 121/78
[52] U.S. Cl. ............................. 260/465 E; 260/465 R; 521/163; 528/64; 560/19; 560/22; 560/50
[58] Field of Search ....................... 260/465 E; 528/64

[56] References Cited

U.S. PATENT DOCUMENTS

| | | | |
|---|---|---|---|
| 3,681,290 | 8/1972 | Meckel et al. | 528/64 X |
| 3,839,292 | 10/1974 | Ermidis | 260/465 E X |
| 3,907,752 | 9/1975 | Frost | 260/465 E X |
| 3,991,023 | 11/1976 | Blahak et al. | 560/19 X |
| 4,133,943 | 1/1979 | Blahak et al. | 528/64 X |

*Primary Examiner*—Dolph H. Torrence
*Attorney, Agent, or Firm*—H. C. Young, Jr.

[57] ABSTRACT

The invention relates to substituted aromatic diamines and polyurethanes cured thereby. The diamines are individually selected from 3,5-diamino-4-tert-alkylbenzoates, 3,5-diamino-4-tert-alkylbenzonitriles and alkylene bis(3-amino-4-tert-alkylbenzoate).

3 Claims, No Drawings

3,5-DIAMINO-4-TERT.-ALKYLBENZONITRILES

This is a division of application Ser. No. 13,697, filed Feb. 21, 1979.

TECHNICAL FIELD

This invention relates to selected aromatic diamines, their method of preparation and their use as curatives for polyurethanes. This invention particularly relates to diamino alkylbenzoates and alkylbenzonitriles, their preparation and their use as polyurethane chain extenders.

BACKGROUND ART

Diamines are especially valuable for curing various polyurethanes, particularly isocyanate terminated polyurethane prepolymers. Aromatic diamine curatives are particularly valuable for curing aromatic isocyanate-terminated prepolymers (to provide polyurethanes having enhanced age resistance in the presence of moisture and various liquid hydrocarbon fuels). However, heretofore, aromatic diamines typically react too fast with aromatic isocyanate-terminated prepolymers and therefore seriously inhibit their commercial significance. The 4,4'-methylene bis (2-chloroaniline), sometimes referred to as MOCA, a well known diamine, is slower reacting at room temperature and should be considered an exception to such typical fast reacting aromatic diamines.

For the MOCA cured aromatic NCO-terminated prepolymers a catalyst is many times used to shorten the reaction time and enhance their commercial significance especially in the preparation of urethane films in solution systems.

Therefore, it is an object of this invention to provide aromatic diamines suitable for curing aromatic isocyanate-terminated polyurethane prepolymers, methods of preparing such aromatic diamines and isocyanate-terminated polyurethanes extended with aromatic diamines.

DISCLOSURE AND PRACTICE OF INVENTION

In accordance with this invention, it has been discovered that such diamines are substituted aromatic diamines selected from the group consisting of 3,5-diamino-4-tert.-alkylbenzoates of the following formula

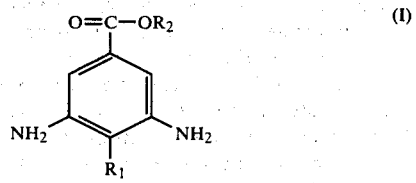

3,5-diamino-4-tert.-alkylbenzonitrile of the formula:

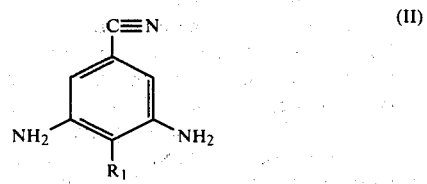

and alkylene bis(3-amino-4-tert.-alkylbenzoate) of the following formula:

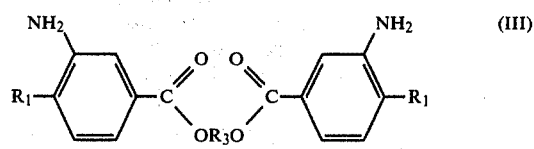

wherein $R_1$ is selected from tertiary saturated hydrocarbon radicals containing 4-6 carbon atoms, $R_2$ is selected from straight and branched saturated hydrocarbon radicals containing 1-20 carbon atoms, cycloaliphatic radicals containing 5-8 carbon atoms, and the phenyl radical, and $R_3$ is selected from straight chain saturated alkylene radicals containing 2-10 carbon atoms.

Representative examples of various $R_1$ radicals are tertiary butyl, tertiary amyl and tertiary hexyl radicals.

Representative of various $R_2$ radicals and methyl, ethyl, propyl, i-propyl, butyl, i-butyl, s-butyl, amyl, hexyl, heptyl, octyl, decyl, cyclopentyl, cyclohexyl, phenyl, octadecyl and dodecyl radicals.

Representative of various $R_3$ radicals are ethylene, 1,3-trimethylene, 1,4-tetramethylene, 1,6-hexamethylene, 1,8-octamethylene and 1,10-decamethylene radicals.

The 3,5-diamino-4-tert-alkylbenzoate of formula (I) is generally a slower curative than methylene dianiline (MDA) but still generally faster than MOCA. It is particularly useful as a curative for preparing cast polyurethanes where MOCA has been considered too slow without the aid of a catalyst.

Representative examples of diamines of formula (I) are
methyl 3,5-diamino-4-tert-butylbenzoate
ethyl 3,5-diamino-4-tert-butylbenzoate
propyl 3,5-diamino-4-tert-butylbenzoate
i-propyl 3,5-diamino-4-tert-butylbenzoate
butyl 3,5-diamino-4-tert-butylbenzoate
s-butyl 3,5-diamino-4-tert-butylbenzoate
i-butyl 3,5-diamino-4-tert-butylbenzoate
amyl 3,5-diamino-4-tert-butylbenzoate
hexyl 3,5-diamino-4-tert-butylbenzoate
heptyl 3,5-diamino-4-tert-butylbenzoate
octyl 3,5-diamino-4-tert-butylbenzoate
decyl 3,5-diamino-4-tert-butylbenzoate
dodecyl 3,5-diamino-4-tert-butylbenzoate
octadecyl 3,5-diamino-4-tert-butylbenzoate
cyclopentyl 3,5-diamino-4-tert-butylbenzoate
cyclohexyl 3,5-diamino-4-tert-butylbenzoate
phenyl 3,5-diamino-4-tert-butylbenzoate.

Further examples of diamines of the formula (I) are
methyl 3,5-diamino-4-tert-amylbenzoate
ethyl 3,5-diamino-4-tert-amylbenzoate
propyl 3,5-diamino-4-tert-amylbenzoate
i-propyl 3,5-diamino-4-tert-amylbenzoate
butyl 3,5-diamino-4-tert-amylbenzoate
s-butyl 3,5-diamino-4-tert-amylbenzoate
i-butyl 3,5-diamino-4-tert-amylbenzoate
amyl 3,5-diamino-4-tert-amylbenzoate
hexyl 3,5-diamino-4-tert-amylbenzoate
heptyl 3,5-diamino-4-tert-amylbenzoate
octyl 3,5-diamino-4-tert-amylbenzoate
decyl 3,5-diamino-4-tert-amylbenzoate
dodecyl 3,5-diamino-4-tert-amylbenzoate
octadecyl 3,5-diamino-4-tert-amylbenzoate
cyclopentyl 3,5-diamino-4-tert-amylbenzoate cyclohexyl 3,5-diamino-4-tert-amylbenzoate
phenyl 3,5-diamino-4-tert-amylbenzoate.

Additional diamines of the formula (I) are
methyl 3,5-diamino-4-tert-hexylbenzoate
ethyl 3,5-diamino-4-tert-hexylbenzoate
propyl 3,5-diamino-4-tert-hexylbenzoate
i-propyl 3,5-diamino-4-tert-hexylbenzoate
butyl 3,5-diamino-4-tert-hexylbenzoate
s-butyl 3,5-diamino-4-tert-hexylbenzoate
i-butyl 3,5-diamino-4-tert-hexylbenzoate
amyl 3,5-diamino-4-tert-hexylbenzoate
hexyl 3,5-diamino-4-tert-hexylbenzoate
heptyl 3,5-diamino-4-tert-hexylbenzoate
octyl 3,5-diamino-4-tert-hexylbenzoate
decyl 3,5-diamino-4-tert-hexylbenzoate
dodecyl 3,5-diamino-4-tert-hexylbenzoate
octadecyl 3,5-diamino-4-tert-hexylbenzoate
cyclopentyl 3,5-diamino-4-tert-hexylbenzoate
cyclohexyl 3,5-diamino-4-tert-hexylbenzoate
phenyl 3,5-diamino-4-tert-hexylbenzoate.

Representative diamines of formula (II) are 3,5-diamino-4-tert-butylbenzonitrile, 3,5-diamino-4-tert-amylbenzonitrile, 3,5-diamino-4-tert-hexylbenzonitrile.

Representative diamines of formula (III) are
ethylenebis (3-amino-4-tert-butylbenzoate)
1,3-trimethylenebis(3-amino-4-tert-butylbenzoate)
1,4-tetramethylenebis(3-amino-4-tert-butylbenzoate)
1,6-hexamethylenebis(3-amino-4-tert-butylbenzoate)
1,8-octamethylenebis(3-amino-4-tert-butylbenzoate)
1,10-decamethylenebis(2-amino-4-tert-butylbenzoate).

Further examples of diamines of the formula (III) are
ethylenebis(3-amino-4-tert-amylbenzoate)
1,3-trimethylenebis(3-amino-4-tert-amylbenzoate)
1,4-tetramethylenebis(3-amino-4-tert-amylbenzoate)
1,6-hexamethylenebis(3-amino-4-tert-amylbenzoate)
1,8-octamethylenebis(3-amino4-tert-amylbenzoate)
1,10-decamethylenebis(3-amino-4-tert-amylbenzoate).

Additional diamines of the formula (III) are
ethylenebis(3-amino-4-tert-hexylbenzoate)
1,3-trimethylenebis(3-amino-4-tert-hexylbenzoate)
1,4-tetramethylenebis(3-amino-4-tert-hexylbenzoate)
1,6-hexamethylenebis(3-amino-4-tert-hexylbenzoate)
1,8-octamethylenebis(3-amino-4-tert-hexylbenzoate)
1,10-decamethylenebis(3-amino-4-tert-hexylbenzoate).

The preferred diamines are
methyl 3,5-diamino-4-tert-butylbenzoate,
ethyl 3,5-diamino-4-tert-butylbenzoate,
propyl 3,5-diamino-4-tert-butylbenzoate,
i-propyl 3,5-diamino-4-tert-butylbenzoate,
butyl 3,5-diamino-4-tert-butylbenzoate,
s-butyl 3,5-diamino-4-tert-butylbenzoate,
octadecyl 3,5-diamino-4-tert-butylbenzoate,
cyclohexyl 3,5-diamino-4-tert-butylbenzoate,
phenyl 3,5-diamino-4-tert-butylbenzoate,
ethylene bis(3-amino-4-tert-butylbenzoate), and
1,4-tetramethylene bis(3-amino-4-tert-butylbenzoate).

The diamino benzoates of this invention are conveniently prepared by (A) the sequential steps of (1) nitration of 4-tert-alkyl benzoic acid with nitric acid in the presence of an additional mineral acid, (2) conversion of the nitrated acid to the acid halide, (3) esterification of the acid halide and (4) hydrogenation of the esterification product in the presence of a catalyst, or by (B) direct, catalytic, esterification of said nitrated 4-tert-alkyl benzoic acid followed by hydrogenation in the presence of a catalyst, where said benzonitriles are prepared by the sequential steps of (1) reaction of the above acid halide with ammonia, (2) dehydration of the resulting amide and (3) hydrogenation of the 3,5-dinitro-4-tert-alkyl benzonitrile in the presence of a catalyst.

In additional accordance with this invention, a cured polyurethane is provided which is prepared by reacting (A) a diamine selected from at least one of the group consisting of said 3,5-diamino-4-tert-alkylbenzoate (formula I), said 3,5-diamino-4-tert-alkylbenzonitrile (formula II) and said alkylene bis(3-amino-4-tert-alkylbenzoate) (formula III) with (B) an isocyanate-terminated prepolymer prepared by the method which comprises reacting a polyisocyanate having an isocyanato functionality of 2 to 3, with a polyol comprised of about 80 to about 100 weight percent polymeric polyols selected from polyester polyols, polyether polyols and hydroxyl terminated unsaturated polymeric polyols, and correspondingly, about 20 to about 0 weight percent monomeric hydrocarbon diols having 3 to 8 carbon atoms; where the ratio of isocyanato groups to hydroxyl groups of the polyol, or polyol mixture, is in the range of about 1.3/1 to about 5/1, and where the ratio of amino groups of said diamine to excess isocyanato groups of said hydroxyl groups is in the range of about 0.5/1 to about 1.1/1.

Representative examples of various monomeric polyols suitable for use in the preparation of the polyurethane are ethylene glycol, 1,3-propane diol, 1,4-butane diol, 1,5-pentane diol, 1,6-hexane diol and decamethylene glycol.

The polyurethane reaction mixtures used in this invention are typically liquid mixtures with the addition of a solvent commonly used to prepare polyurethanes, if desired, and particularly flexible polyurethanes, by the well known one-shot prepolymer or quasi-prepolymer techniques. The quasi-prepolymer method differs from the prepolymer method in that only a portion of the polyol is initially reacted with the polyisocyanate, with the remainder then added and reacted to form the prepolymer. The prepolymer is then cured or extended with the diamine.

The curative, polyols and polyisocyanates are typically reacted at temperatures in the range of about 20° C. to about 150° C. and preferably in the range of about 20° C. to about 100° C.

A solvent can be used with the reaction mixture to facilitate its use in the form of a fluid mixture or solution, although it is generally preferred to use the reaction mixture with only a minor amount of solvent, if any. If a solvent is used, it can be added to form a mixture containing up to about 60 weight percent solvent based on the total mixture. A preferable mixture can contain from about 40 to about 95 weight percent solids. However, a higher or lower concentration of solids might be used. When the solids concentration is low, the individual applications will tend to deposit a thin layer of polyurethane polymer and a large amount of the solvent will have to be removed during the curing process. A solids concentration of 45 weight percent or higher is generally desired if a solvent is used.

Other methods generally known for the preparation of polyurethane reaction mixtures with or without the aid of solvents may also be used.

The diamine curative of this invention has a curative reactivity which allows improved processing for many commercial applications. Indeed, its typical curative reactivity with aromatic isocyanate-terminated polyurethane prepolymers enhances such a polyurethane's commercial significance. The curative reactivity is valuable because it typically provides a shorter reaction time instead of the rather slow reaction provided by sterically hindered diamines like 4,4'-methylene-bis-(2-chloroaniline), otherwise known as MOCA.

Thus, the diamine curatives of this invention can, if desired, eliminate the need of a catalyst such as the well-known tertiary amines, the tin salts of fatty acids, such as dibutyltin dilaurate and stannous octoate and accelerators such as mercaptobenzothiazole.

In the preparation of the polyurethanes by this invention, the polymeric polyols typically comprise at least one member selected from the group consisting of polyester polyols, polyether polyols, and hydroxyl-terminated unsaturated polymeric polyols. The hydroxyl-terminated unsaturated polymeric polyols typically have a molecular weight of from about 2000 to about 4000 and a hydroxyl functionality of from about 2 to about 3. The reactive hydrogen-containing material generally used, other than the hydroxyl-terminated unsaturated polymeric polyol, has a molecular weight in the range of from about 500 to about 5000, and usually from about 1000 to about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid and azelaic acid. The anhydrides of such acids can be used in place of the acid. If desired, from about 1 to 20 percent by weight of a triol or higher polyfunctional polyol or polyfunctional acid can be present to produce branching in the polyurethane polymer.

Further examples of polyesters are caprolactone polyesters. The caprolactone polyesters are substantially linear, hydroxyl-terminated polymers prepared by reacting a caprolactone having 6 to 8 carbon atoms, preferably 6 carbon atoms, with a glycol having 4 to 7 carbon atoms and preferably 4 to 6 carbon atoms. Various suitable caprolactones include $\epsilon$-caprolactone, zeta-caprolactone and eta-caprolactone. Alkyl substituted caprolactones can be used with alkyl substituents containing 1 to 2 carbon atoms selected from methyl and ethyl radicals such as methyl $\epsilon$-caprolactone. Desirably, the caprolactone polyester has a molecular weight in the range of about 800 to about 3500, preferably about 1200 to about 3000, with corresponding hydroxyl numbers in the range of about 140 to about 32 and about 95 to about 37, respectively.

Polyether polyols useful in preparing the polyurethanes of this invention can be prepared by polymerizing or copolymerizing alkylene oxides, such as ethylene oxide, propylene oxide, and butylene oxides, by polymerizing or copolymerizing the low molecular weight glycols, or by the reaction of one or more such alkylene oxides with the glycols or with triol, or with a polycarboxylic acid, such as phthalic acid. The polyether polyols include polyalkylenearyl ether glycols or triols, polytetramethylene ether glycols, polyalkylene ether-thioether glycols or triols and alkyd resins. Generally the polytetramethylene ether glycols are the preferred polyether glycols.

It is usually preferred that the hydroxyl-terminated unsaturated polymeric polyol has a molecular weight of from about 2000 to about 4000 and a corresponding hydroxyl number of from about 50 to about 25. The hydroxyl-terminated unsaturated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to abut 30 percent styrene with the aid of organic peroxy catalysts to provide polymers which are generally terminated at both ends of their chain with hydroxyl groups and have a hydroxyl functionality of from about 2 to about 3 and usually from about 2.1 to about 2.8. The preferred hydroxyl-containing polymeric polyols are polybutadiene polyols, polyisoprene polyols, butadiene-styrene copolymer polyols having about 70 to 90 percent units derived from butadiene and about 30 to 10 percent units derived from styrene and also butadiene-acrylonitrile copolymer polyols.

The organic polyisocyanates used in this invention having 2 to 3 isocyanato groups particularly include various organic diisocyanates, dimers and trimers thereof, and their mixtures as well as polyisocyanates having 2.3 to 2.7 isocyanato groups. The organic polyisocyanates can be aromatic, aliphatic or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate), 3,3'-dimethyl-4,4'-diphenylmethane diisocyanate and 1,5-tetrahydronaphthalene diisocyanate and mixtures of such diisocyanates. For the purposes of the present invention, the toluene diisocyanates, diphenylmethane-4,4'-diisocyanate, 3,3'-dimethyl-4,4'-bisphenylene diisocyanate, 4,4'-methylene-bis(cyclohexylisocyanate) and 3,3'-dimethyl-4,4'-diphenylmethane diisocyanate are preferred. For convenience, these diisocyanates are sometimes referred to as TDI, MDI, TODI, $H_{12}$MDI and DMMDI, respectively.

Various non-reactive solvents known to those skilled in the polyurethane art can be used for the preparation of the prepolymer solutions and polyurethane reaction mixtures, if a solvent is desired. Representative examples of the solvents are aromatic solvents such as benzene, xylene and toluene and the liquid lower ketones such as acetone, methyl ethyl ketone, methyl isobutyl ketone and diisobutyl ketone. If the polyurethane reaction mixtures are to be used to prepare the cured polyurethanes in confined areas which are subject to explosive hazards, nonflammable polyurethane solvents can be used to form nonflammable polyurethane reaction mixtures. Mixtures of solvents may also be used to obtain satisfactory spreading properties and evaporation rates when the polyurethane spray composition is applied to a polymeric surface.

To enhance the cured polyurethane's hydrolysis resistance, about 1 to about 15, preferably about 2 to about 5, weight percent of an epoxy resin and at least sufficient to give an excess of epoxide groups relative to the total excess of amino groups of the diamine curative over the said isocyanato groups might be used.

Thus, for such a modification an excess of epoxide groups is required over the amino groups of the curative, such as at least about 5 to about 50 equivalent percent excess, based on two epoxy groups per amino (—NH$_2$) group, to provide a polyurethane composition containing sufficient free epoxide groups.

Hydrolysis resistance is typically determined by immersion in distilled water at 158° F. A substantial retention of tensile strength and elongation after 12 days immersion can be related to a substantial resistance to hydrolysis. The tensile and elongation are normally determined at about 25° C. by methods typically used by those skilled in the art.

Preferred resins for this invention are derived from epichlorohydrin and 2,2'-bis(4-hydroxyphenyl) propane with an epoxide equivalency of about 150 to about 220, preferably about 175 to about 210. Resins which are pourable liquids at about 25° C. are preferred but others can be used in solution. Typical resins are those obtainable under the tradenames Epon 828 and Epon 1001 from the Shell Chemical Company.

The 3,5-diamino-4-tert-alkyl benzoates of this invention are preferably prepared by first nitrating the appropriate 4-tert.-alkyl benzoic acid with nitric acid in the presence of an additional mineral acid such as sulfuric acid. The nitration step is generally conducted at a temperature in the range of about 60° C. to about 100° C. for about 3 to about 4 hours with the concentration of the benzoic acid being about 40 to about 60 weight percent based on nitric acid and the amount of additional mineral acid being in an amount of about 400 to about 800 weight percent based on the nitric acid. The nitration product is then recovered by pouring over crushed ice with stirring, filtering the solid acid, washing with water and drying following which it is esterified by treatment in an aromatic hydrocarbon solvent with thionyl chloride, reacting the resulting acid chloride with linear or branched aliphatic alcohols having 1-20 carbon atoms, with phenols, araliphatic alcohols or cycloaliphatic alcohols, optionally in the presence of an acid binding agent such as sodium or potassium hydroxide or a tertiary organic amine such as triethylamine or pyridine, and also optionally in the presence of an aromatic hydrocarbon solvent, or by reacting the nitrated acid with an alcohol in an aromatic hydrocarbon solvent in the presence of a mineral acid or cation exchange resin catalyst at a temperature in the range of about 80° C. to about 160° C. for about 4 to about 48 hours. The esterification product is recovered by evaporation of the solvent and reduced in an organic solvent such as methanol, tetrahydrofuran or benzene with hydrogen at 500–2000 psi at 25° to 160° C. in the presence of a hydrogenation catalyst selected from catalysts commonly employed in the hydrogenation of aromatic nitro compounds such as platinum or palladium.

In the practice of this invention, the 3,5-diamino-4-tert.-alkyl benzonitrile is conveniently prepared by reacting at 0° C. to 25° C. the previously mentioned acid chloride with aqueous or anhydrous ammonia, optionally, in the presence of an aromatic hydrocarbon solvent, and recovering the 3,5-dinitro-4-tert.-alkyl benzamide by filtration. The amide is dehydrated by reacting it in an aromatic hydrocarbon solvent with dehydrating agents commonly employed for this purpose such as phosphorous oxychloride, phosphorous pentoxide, phosphorous pentachloride, phosphorous trichloride or thionyl chloride, preferably at the boiling point of the solvent for 1 to 6 hours, pouring the reaction product over ice and recovering the 3,5-dinitro-4-tert.-alkylbenzonitrile by filtration and evaporation of the solvent. The dinitronitrile is hydrogenated to the diaminonitrile in a solvent such as tetrahydrofuran, methanol or benzene with hydrogen at a pressure of 500–2000 psi at 50°–160° C. for 1 to 6 hours in the presence of a hydrogenation catalyst, preferably copper chromite. The diamine is recovered by evaporation of the solvent.

The practice of this invention is further illustrated by reference to the following examples which are intended to be representative rather than restrictive of the scope of the invention. Unless otherwise indicated, all parts and percentages are by weight.

EXAMPLE I

A 3,5-dinitro-4-t-butylbenzoate was prepared from 3,5-dinitro-4-t-butylbenzoic acid by the following acid chloride method.

To a reactor fitted with a mechanical stirrer, addition funnel, thermometer and reflux condenser, was charged 83.5 parts of 3,5-dinitro-4-tert.-butylbenzoic acid and 88 parts benzene. The mixture was stirred and heated on a steam bath to a temperature of about 70° C. to about 80° C. to which was slowly added dropwise 55.7 parts thionyl chloride. At the conclusion of this addition, 2 parts of dimethyl formamide were added and the resulting mixture refluxed for about 2 hours. The solution resulting therefrom was concentrated on the steam bath by evaporation to remove the solvent and excess chloride.

The molten acid chloride product was stirred and 25.4 parts of isobutyl alcohol were slowly added dropwise. The mixture was refluxed for 2 hours, and allowed to cool. The recovered product was recrystallized from hexane to yield 80.1 parts of ester having a melting point of about 117° C. to 119° C.

EXAMPLE II

A 3,5-dinitro-4-t-butylbenzoate was prepared from 3,5-dinitro-4-t-butylbenzoic acid by the following direct method.

To a reactor fitted with mechanical stirrer, Dean-Start trap and reflux condenser was charged 85 parts 3,5-dinitro-4-tert.-butyl benzoic acid, 264 parts benzene, 12 parts ion exchange resin (obtained as Dowex 50 from the Dow Chemical Company) which had been water washed and toluene azeotrope dried, and 58.7 parts of n-butyl alcohol. The mixture was stirred and allowed to reflux overnight for about 16 hours. The mixture was filtered to remove the resin and the filtrate concentrated by evaporation under a reduced pressure at a temperature of about 50° C. The recovered solid was recrystallized from methanol to yield 72 parts of an ester having a melting point of about 62°–63° C.

EXAMPLE III

A 3,5-diamino-4-t-butylbenzoate was prepared from 3,5-dinitro-4-t-butylbenzoate by the following method:

An autoclave was charged with 114 parts of methyl 3,5-dinitro-4-t-butyl benzoate, 400 parts of methanol and 5 parts of a catalyst comprising 5% palladium on carbon (obtained as Girdler G-81C from the Girdler Chemical, Inc., Company). The mixture was hydrogenated at about 60° C. under 1000 pounds per square inch pressured hydrogen for about 5 hours. The product was filtered to remove the catalyst and the filtrate concentrated under reduced pressure at a temperature of about 50° C. to yield 89.8 parts of a diamine as a reddishbrown liquid which subsequently crystallized to yield a solid having a melting point of about 57°–58° C.

EXAMPLE IV 3,5-dinitro-4-t-butylbenzamide was prepared according to the following method.

In a suitable container, 175 parts of 3,5-dinitro-4-tert-butylbenzoyl chloride, prepared according to the method of Example I, were dissolved in 176 parts benzene and slowly added dropwise to 315 parts of concentrated ammonium hydroxide at a temperature in the range of about 5° C. to about 15° C. After stirring for about 1 hour, the product was filtered, washed with water, and dried at about 60° C. to yield 155 parts of solid amide having a melting point of 230°–236° C. This yield was calculated to be about 95% of theoretical. The product was analyzed and calculated for $C_{11}H_{13}N_3O_5$, with corresponding percentages as C—49.44, H—4.87, N—15.73 from which was found C—49.70, H—5.08 and N—15.49.

EXAMPLE V 3,5-dinitro-4-t-butylbenzonitrile was prepared according to the following method.

To a reactor was charged 87 parts phosphorous oxychloride, 435 parts toluene and 149 parts of 3,5-dinitro-4-tert-butylbenzamide. The mixture was stirred and refluxed for about 3 hours. After cooling the solution was poured over ice and the resulting mixture stirred until the ice melted. The product was filtered to remove some solid product which was apparently insoluble in the volume of toluene employed. The organic layer was separated from the filtrate, washed with water and concentrated by evaporation under reduced pressure at a temperature of about 50° C. The combined solids were boiled in methanol, cooled and filtered to yield 127 parts of the nitrile having a melting point of 200°–202° C. The product was calculated for a formula of $C_{11}H_{11}N_3O_4$ with corresponding percentages as C—53.01, H—4.42 and N—16.87 which corresponded favorable to the analytically determined C—53.16, H—4.50 and N—16.96.

EXAMPLE VI 3,5-diamino-4-t-butylbenzonitrile was prepared from 3,5-dinitro-4-t-butylbenzonitrile by the following method.

An autoclave was charged with 67 parts 3,5-dinitro-4-tert-butylbenzonitrile, 355 parts tetrahydrofuran and 10 parts copper chromite catalyst (obtained as Girdler G-22 from the Girdler Chemical, Inc., Company). The mixture was hydrogenated at 138° C. under 1000 pounds per square inch hydrogen for about 3 hours. The mixture was filtered and the filtrate concentrated by evaporation under a reduced pressure at about 50° C. to yield 50.7 parts of the diamine having a melting point of 127°–128° C. The product was calculated for the formula $C_{11}H_{15}N_3$ with corresponding percentages of C—69.84, H—7.94 and N—22.22 from which was analytically found C—69.91, H—7.98 and N—22.07.

EXAMPLE VII

Various 3,5-dinitro-4-tert.-butylbenzoates were prepared by the method exemplified in Example I (via acid chloride) and Example II (direct method), having the general formula:

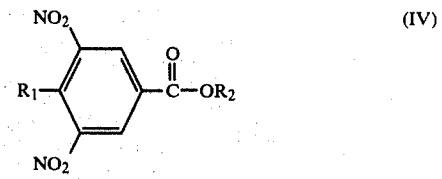

where $R_1$ is a tertiary butyl radical and $R_2$ represents various hydrocarbon radicals.

The results of the preparations are more clearly shown in the following Table 1.

TABLE 1

Preparation of 3,5-Dinitro-4-t-butylbenzoates of Formula (IV)

| Exp. No | $R_2$ | Esterification Method[a] | Yield (%) | mp (°C.) | Calc'd (%) C | H | N | Found (%) C | H | N |
|---|---|---|---|---|---|---|---|---|---|---|
| 1 | $CH_3$ | A | 65.4 | 116–117 | 51.06 | 4.96 | 9.93 | 51.33 | 5.03 | 10.01 |
| 2 | $C_2H_5$ | A | 65.7 | 86–87 | 52.70 | 5.41 | 9.46 | 52.83 | 5.48 | 9.60 |
| 3 | $n\text{-}C_3H_7$ | B | 66.6 | 83–84 | 54.19 | 5.81 | 9.03 | 53.98 | 5.78 | 9.20 |
| 4 | $i\text{-}C_3H_7$ | A | 62.5 | 129–130 | 54.19 | 5.81 | 9.03 | 54.09 | 5.77 | 8.96 |
| 5 | $n\text{-}C_4H_9$ | B | 70.0 | 63–63 | 55.56 | 6.17 | 8.64 | 55.61 | 6.10 | 8.52 |
| 6 | $i\text{-}C_4H_9$ | A | 80.0 | 117–119 | 55.56 | 6.17 | 8.64 | 55.34 | 6.24 | 8.44 |
| 7 | $s\text{-}C_4H_9$ | A | 64.0 | 102–103 | 55.56 | 6.16 | 8.64 | 55.59 | 6.17 | 8.53 |
| 8 | $n\text{-}C_{18}H_{37}$ | B | 63.0 | 78–79 | 66.92 | 9.23 | 5.38 | 67.00 | 9.31 | 5.22 |
| 9 | $C_6H_{11}$ | A | 66.2 | 142–144 | 58.29 | 6.29 | 8.00 | 58.39 | 6.30 | 7.92 |
| 10 | $C_6H_5$ | A | 62.5 | 124–125 | 59.30 | 4.65 | 8.14 | 59.10 | 4.52 | 8.09 |

[a]Method A - via acid chloride; Method B - direct.

EXAMPLE VIII

Various 3,5-diamino-4-tert.-butylbenzoates were prepared according to the method of Experiment III having the general formula (I):

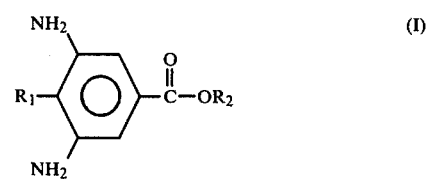

where $R_1$ is a tertiary butyl radical and $R_2$ is selected from various radicals.

The results of these preparations are more clearly shown in the following Table 2.

TABLE 2

Preparation of 3,5-Diamino-4-t-butylbenzoates of Formula(I)

| Exp. No. | $R_2$ | Yield (%) | mp (°C.) | Calc'd (%) C | H | N | Found (%) C | H | N |
|---|---|---|---|---|---|---|---|---|---|
| 1 | $CH_3$ | 100.0 | 57–58 | 64.86 | 8.11 | 12.61 | 64.75 | 8.00 | 12.56 |
| 2 | $C_2H_5$ | 91.9 | Oil | 66.10 | 8.47 | 11.86 | 65.97 | 8.63 | 11.81 |
| 3 | $n\text{-}C_3H_7$ | 62.4 | Oil | 67.20 | 8.80 | 11.20 | 67.23 | 8.91 | 10.93 |
| 4 | $i\text{-}C_3H_7$ | 99.5 | 117–118 | 67.20 | 8.80 | 11.20 | 67.15 | 8.61 | 11.15 |
| 5 | $n\text{-}C_4H_9$ | 95.7 | Oil | 68.18 | 9.09 | 10.61 | 68.35 | 9.19 | 10.46 |
| 6 | $i\text{-}C_4H_9$ | 100.0 | Oil | 68.18 | 9.09 | 10.61 | 67.98 | 9.20 | 10.39 |
| 7 | $s\text{-}C_4H_9$ | 95.5 | Oil | 68.18 | 9.09 | 10.61 | 68.08 | 9.13 | 10.57 |
| 8 | $n\text{-}C_{18}H_{37}$ | 99.8 | 58–59 | 75.65 | 11.30 | 6.09 | 75.81 | 11.20 | 5.98 |
| 9 | $C_6H_{11}$ | 90.0 | 90–93 | 70.34 | 8.97 | 9.66 | 70.50 | 8.77 | 9.48 |
| 10 | $C_6H_5$ | 91.7 | 96–97 | 71.83 | 7.30 | 9.86 | 71.73 | 7.12 | 9.66 |

EXAMPLE IX

A series of cured polyurethanes was prepared by reacting various diamines of this invention with an isocyanate-terminated polyurethane prepolymer.

The prepolymer was prepared by reacting an excess of 4,4'-diphenyl methane diisocyanate with a polymeric polyester of ε-caprolactone and diethylene glycol having a molecular weight of about 2000.

The experiments and physical properties are summarized and shown in Table 3. The Rv value relates to the ratio of NCO/OH radicals of the diisocyanate and polymeric polyester used to make the prepolymer and the amine level value relates to the ratio of $NH_2$ radicals of the diamine curative to excess NCO groups over the amount needed to react with the OH groups of the polymeric polyester of the preopolymer. The diamine formula relates to the structural formula of the diamine of this invention, already hereinbefore described, which was used. For the formulas (I), (II) and (III), $R_1$ is a tertiary butyl radical and for formula III, $R_3$ is an ethylene radical.

The various physical properties of the cured polyurethanes were determined by conventional means and demonstrate that cured polyurethanes were effectively successfully prepared with diamines of this invention.

EXAMPLE X

A series of cured polyurethanes was prepared by reacting various diamines of this invention with various isocyanate-terminated polyurethane prepolymers.

The prepolymers were prepared by reacting an excess of various diisocyanates with various polymeric polyether and polyester polyols. The diisocyanates were selected from 2,4-toluene diisocyanate (TDI), 4,4'-diphenyl methane diisocyanate (MDI) and 3,3'-dimethyl-4,4'-diisocyanato diphenyl methane (DMMDI). The various polymeric polyols were selected from polyethylene adipate with a molecular weight (mw) of about 1000, polypropylene adipate (mw 2000), poly(ethylenepropylene) adipate (mw 1800) and polytetramethylene ether glycol (mw 2000).

The experiments and physical properties are summarized in Table 4. The Rv value is the NCO/OH ratio of the prepolymer. The diamine formula relates to the structural formula of the diamine of the invention. For the formula (I), (II) and (III), $R_1$ is a tertiary butyl radical and for formula (III) $R_3$ is an ethylene radical.

As in Example IX and Table 3, the various physical properties were measured by conventional means. The values for the various polymeric polyols are the relative amounts used by weight, with the total being a normalized 100. The pot life relates the time from mixing the diamine curative with the prepolymer until the mixture is very difficult to pour.

TABLE 3

PHYSICAL PROPERTIES OF POLYURETHANES

| Experiment No. | 1 | 2 | 3 | 4 | 5 | 6 | 7 | 8 | 9 | 10 | 11 |
|---|---|---|---|---|---|---|---|---|---|---|---|
| Rv | 2.0 | 1.9 | 2.0 | 1.9 | 2.0 | 1.9 | 1.9 | 1.9 | 1.9 | 1.9 | 1.9 |
| Amine Level | 0.84 | 0.83 | 0.84 | 0.83 | 0.84 | 0.83 | 0.83 | 0.83 | 0.83 | 0.83 | 0.82 |
| Diamine Formula | I | I | I | I | I | I | I | I | I | II | III |
| $R_2$ | $CH_3$ | $C_2H_5$ | $n\text{-}C_3H_7$ | $i\text{-}C_3H_7$ | $n\text{-}C_4H_9$ | $s\text{-}C_4H_9$ | $n\text{-}C_{18}H_{37}$ | $C_6H_{11}$ | $C_6H_5$ | | |
| 100% Modulus, psi | 370 | 330 | 300 | 320 | 340 | 750 | 330 | 330 | 330 | 380 | 330 |
| 300% Modulus, psi | 1100 | 680 | 690 | 620 | 1100 | 910 | 560 | 630 | 650 | 700 | 700 |
| 500% Modulus, psi | — | 3900 | — | 3700 | — | 2200 | 2100 | 3300 | — | 2400 | 3800 |
| Ult Tensile (psi) | 5400 | 5700 | 4500 | 5200 | 4500 | 5800 | 5400 | 6300 | 5400 | 5300 | 5300 |
| Ult Elong (%) | 450 | 540 | 480 | 530 | 410 | 670 | 610 | 570 | 500 | 650 | 540 |
| Crescent Tear (lb/in) | 230 | 240 | 200 | 220 | 210 | 400 | 230 | 230 | 230 | 290 | 270 |
| Compression Set (%) | 26 | — | 25 | — | 24 | — | 34 | — | 38 | 61 | 60 |
| Shore A Hardness | 70 | 73 | 68 | 71 | 68 | 95 | 67 | 69 | 67 | 69 | 67 |
| Shore D Hardness | 22 | 23 | 20 | 22 | 20 | 50 | 20 | 22 | 22 | 35 | 21 |

TABLE 4

PHYSICAL PROPERTIES OF POLYURETHANES

| Experiment | A | B | C | D | E | F |
|---|---|---|---|---|---|---|
| Polyethylene adipate | 55 | 55 | 55 | 55 | 45 | — |
| Polypropylene adipate | — | — | — | — | 55 | — |

TABLE 4-continued

| PHYSICAL PROPERTIES OF POLYURETHANES | | | | | | |
|---|---|---|---|---|---|---|
| Experiment | A | B | C | D | E | F |
| Polyethylene-propylene adipate | 45 | 45 | 45 | 45 | — | — |
| Polytetramethylene ether glycol | — | — | — | — | — | 100 |
| 2,4-TDI $R_v$ | 2.1 | 2.1 | 2.1 | 2.1 | — | — |
| MDI $R_v$ | — | — | — | — | 2.0 | — |
| DMMDI $R_v$ | — | — | — | — | — | 1.9 |
| Diamine Formula | I | III | II | I | * | ** |
| $R_2$ | s-$C_4H_9$ | — | — | n-$C_{18}H_{37}$ | — | — |
| 100% Modulus, psi | 1100 | 960 | 960 | — | 270 | 680 |
| 300% Modulus, psi | 2000 | 1900 | 1400 | — | 600 | 1600 |
| 500% Modulus, psi | 5800 | — | 3000 | — | 2600 | — |
| Ultimate Tensile, (psi) | 7700 | 5700 | 3400 | — | 4400 | 4300 |
| Ultimate Elongation (%) | 570 | 500 | 550 | — | 530 | 570 |
| Crescent Tear (lb/in) | 540 | 503 | 477 | — | 410 | 280 |
| Compression Set (%) | — | 68 | 37 | 54 | — | 16 |
| Shore A Hardness | — | — | — | — | 75 | 79 |
| Pot Life. Minutes | 0.8 | >1 | 2.5 | 1.5 | 1 | — |

*For experiment (E), the diamine was bis(2-aminophenyl) sulfide
**For experiment (F), the diamine was 3,5-diaminobenzotrifluoride In these examples and in the practice of this invention, the alkylene bis(3-amino-4-tert-alkylbenzoate), the formula III compounds, can be conveniently prepared by mononitration of the appropriate 4-tert-alkylbenzoic acid in the presence of an additional mineral acid, followed by esterifying the resultant mononitro acid with thionyl chloride to form an acid chloride, reacting the acid chloride with a glycol containing 2–10 carbon atoms and converting the esterification product to the diamine by hydrogenation.

While certain representative embodiments and details have been shown for the purpose of illustrating the invention, it will be apparent to those skilled in this art that various changes and modifications may be made therein without departing from the spirit or scope of the invention.

We claim:

1. A 3,5-diamino-4-tert.-alkylbenzonitrile of the formula

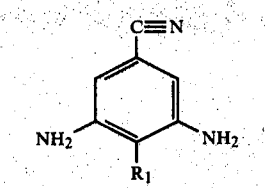

(II)

wherein $R_1$ is selected from tertiary saturated hydrocarbon radicals containing 4–6 carbon atoms.

2. The 3,5-diamino-4-tert.-alkylbenzonitrile of claim 1 where $R_1$ is selected from tertiary butyl, tertiary amyl and tertiary hexyl radicals.

3. The 3,5-diamino-4-tert.-alkylbenzonitrile of claim 1 selected from the group consisting of 3,5-diamino-4-tert-butylbenzonitrile, 3,5-diamino-4-tert-amylbenzonitrile and 3,5-diamino-4-tert-hexylbenzonitrile.

* * * * *